US009955062B2

(12) United States Patent
Feltham et al.

(10) Patent No.: US 9,955,062 B2
(45) Date of Patent: *Apr. 24, 2018

(54) PEER TO PEER AUDIO VIDEO DEVICE COMMUNICATION

(71) Applicant: International Business Machines Corporation, Armonk, NY (US)

(72) Inventors: Andrew S. Feltham, Chandlers Ford (GB); Elizabeth J. Maple, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,200

(22) Filed: Jan. 23, 2017

(65) Prior Publication Data

US 2017/0134636 A1 May 11, 2017

Related U.S. Application Data

(63) Continuation of application No. 14/791,506, filed on Jul. 6, 2015.

(30) Foreign Application Priority Data

Jul. 8, 2014 (GB) .................................. 1412095.0

(51) Int. Cl.
*H04N 5/232* (2006.01)
*H04N 9/806* (2006.01)
(Continued)

(52) U.S. Cl.
CPC ......... *H04N 5/23206* (2013.01); *H04N 5/765* (2013.01); *H04N 5/77* (2013.01);
(Continued)

(58) Field of Classification Search
CPC .... H04N 5/23206; H04N 5/772; H04N 7/183; H04N 5/765; H04N 7/18; H04N 9/806; G06F 3/00
(Continued)

(56) References Cited

U.S. PATENT DOCUMENTS 6,188,431 B1 2/2001 Oie
7,221,520 B2 5/2007 Dowling et al.
(Continued)

FOREIGN PATENT DOCUMENTS

CA 2802293 A1 8/2013
EP 1881501 A1 1/2008
(Continued)

OTHER PUBLICATIONS

IBM, List of IBM Patents and Patent Applications Treated as Related (Appendix P), Jul. 6, 2015, pp. 1-2.
(Continued)

*Primary Examiner* — Tung Vo
*Assistant Examiner* — Zaihan Jiang
(74) *Attorney, Agent, or Firm* — Stosch Sabo

(57) ABSTRACT

A system, method and computer program product for communicating between a primary audio video device and other audio video devices comprising: detecting orientation and position of the primary audio video device; detecting a distance between the primary audio video device and a primary subject in focus on the primary audio video device; locating other networkable audio video devices for communication; receiving subject data for a real time video of a subject from one or more of the located networkable audio video devices; determining from subject data which networkable audio video devices are near the primary subject; determining one or more primary subject audio video devices for use in recording audio for a video; and synchro-
(Continued)

nizing determined one or more primary subject audio video devices for recording audio when one or more of the audio video devices is recording video of the primary subject.

11 Claims, 5 Drawing Sheets

(51) Int. Cl.
H04N 5/77 (2006.01)
H04N 7/18 (2006.01)
H04N 5/765 (2006.01)

(52) U.S. Cl.
CPC ............ *H04N 5/772* (2013.01); *H04N 7/18* (2013.01); *H04N 9/806* (2013.01)

(58) Field of Classification Search
USPC ........................................ 348/159
See application file for complete search history.

(56) References Cited

U.S. PATENT DOCUMENTS

| | | | |
|---|---|---|---|
| 7,394,366 | B2 | 7/2008 | Moquin et al. |
| 7,840,130 | B2 | 11/2010 | Kucharyson |
| 7,990,422 | B2 | 8/2011 | Ahiska et al. |
| 8,121,468 | B2 | 2/2012 | Clark |
| 8,131,541 | B2 | 3/2012 | Yen et al. |
| 8,144,204 | B2 | 3/2012 | Strandwitz et al. |
| 8,164,617 | B2 | 4/2012 | Mauchly |
| 9,509,867 | B2 | 11/2016 | Camp, Jr. et al. |
| 9,742,976 | B2* | 8/2017 | Feltham ............ H04N 5/23206 |
| 2003/0133018 | A1 | 7/2003 | Liemkowski |
| 2004/0037436 | A1* | 2/2004 | Rui ........................ H04R 3/005 381/92 |
| 2006/0132485 | A1* | 6/2006 | Milinusic ......... G08B 13/19613 345/419 |
| 2006/0165405 | A1 | 7/2006 | Kanai et al. |
| 2007/0223901 | A1 | 9/2007 | Fujimoto |
| 2008/0310686 | A1* | 12/2008 | Kretz ................ G06K 9/00255 382/118 |
| 2009/0189981 | A1* | 7/2009 | Siann ..................... H04N 7/183 348/143 |
| 2010/0183280 | A1 | 7/2010 | Beauregard et al. |
| 2010/0271490 | A1 | 10/2010 | Jung et al. |
| 2011/0109726 | A1 | 5/2011 | Hwang et al. |
| 2011/0175551 | A1* | 7/2011 | Wood ...................... F21S 6/00 315/297 |
| 2011/0211096 | A1 | 9/2011 | Aagaard et al. |
| 2012/0044354 | A1 | 2/2012 | Cheng et al. |
| 2012/0169873 | A1 | 7/2012 | Hsieh |
| 2012/0268616 | A1 | 10/2012 | Strandwitz et al. |
| 2012/0307091 | A1 | 12/2012 | Yumiki et al. |
| 2013/0120596 | A1 | 5/2013 | You |
| 2013/0120636 | A1 | 5/2013 | Baer |
| 2013/0210563 | A1 | 8/2013 | Hollinger |
| 2013/0271613 | A1 | 10/2013 | Retterath et al. |
| 2014/0028817 | A1 | 1/2014 | Brockway, III et al. |
| 2014/0043493 | A1 | 2/2014 | Bateman et al. |
| 2014/0043495 | A1 | 2/2014 | Bateman et al. |
| 2014/0140675 | A1* | 5/2014 | de Sa ............... H04N 21/21805 386/223 |
| 2014/0152836 | A1* | 6/2014 | Morris ............. G08B 13/19608 348/159 |
| 2014/0362246 | A1 | 12/2014 | Nakano et al. |
| 2016/0014321 | A1* | 1/2016 | Feltham ................... H04N 7/18 348/159 |

FOREIGN PATENT DOCUMENTS

| | | |
|---|---|---|
| GB | 2482140 A | 1/2012 |
| JP | 5084640 B2 | 11/2012 |
| WO | 2007052269 A2 | 5/2007 |
| WO | 2012100114 A2 | 7/2012 |

OTHER PUBLICATIONS

Pending U.S. Appl. No. 14/791,503, filed Jul. 6, 2015, entitled: "Peer to Peer Camera Communication", 23 pages.
Pending U.S. Appl. No. 14/791,504, filed Jul. 6, 2015, entitled: "Peer to Peer Lighting Communication", 24 pages.
"Communication options for Canon's Wireless File Transmitters", Canon Professional Network, http://cpn.canon-europe.com/content/education/technical/wifi_options.do, Jul. 2011. pp. 1-9.
"Compatibility information on Wi-Fi enabled Canon digital compact cameras", compatibility-information—Wireless Compact Cameras—Canon UK, http://www.canon.co.uk/for_home/product_finder/cameras/digital_camera/wi-fi/compatibility-information/, Accessed on Mar. 16, 2015, pp. 1-12.
Wikipedia, "Epipolar geometry", http://en.wikipedia.org/wiki/Epipolar_geometry, Accessed on Mar. 26, 2015, pp. 1-4.
GB Application No. 1412093.5, filed on Jul. 8, 2014, entitled: "Peer to Peer Camera Communication", 23 pages.
United Kingdom Search Report, Application No. GB1412093.5, dated Feb. 2, 2015, 3 pages.
GB Application No. 1412094.3, filed on Jul. 8, 2014, entitled "Peer to Peer Camera Lighting Communication", 24 pages.
United Kingdom Search Report, Application No. GB1412094.3, dated Feb. 2, 2015, 3 pages.
GB Application No. 1412095.0, filed on Jul. 8, 2014, entitled "Peer to Peer Audio Video Device Communication", 24 pages.
United Kingdom Search Report, Application No. GB1412095.0, dated Jan. 14, 2015, 4 pages.
Wikipedia, "Geotagged photograph", Geotagged photograph-Wikipedia, the free encyclopedia, http://en.wikipedia.org/wiki/Geotagged_photograph#/Automatic_using_a_built_in_GPS,accessed on Mar. 26, 2015, 4 pages.
Goldstein, "Getting Started with Off-Camera Flash", Photography Blog, http://photographyblog.com/articles/getting_started_with_off-camera_flash/, Feb. 18, 2011. pp. 1-7.
Iqbal et al., "A Distributed Camera Network Architecture Supporting Video Adaptation", 2009 IEEE, pp. 1-7.
Solmeta, "GPS receiver for Nikon camera >Geotagger N2", Product_View, http://www.solmeta.com/Product/show/id/3, accessed on Mar. 26, 2015, pp. 1-2.
"Wireless Networking with Nikon Cameras", Wireless Networking with Nikon Cameras, http://cdn-10.nikon-cdn.com/pdf/nikon_wireless.pdf, pp. 1-22.
GB Office Action; Notification of Reasons for Refusal,Application No. GB1412095.0. dated Apr. 29, 2016. 2 pages.
Decision to Grant a Patent, dated Jul. 5, 2016. 2 pages.
List of IBM Patents or Patent Applications Treated as Related, Jan. 20, 2017, 2 pages.
Feltham, et al., "Peer to Peer Audio Video Device Communication", U.S. Appl. No. 14/791,506, filed Jul. 6, 2015.

* cited by examiner

PEER TO PEER AUDIO VIDEO DEVICE COMMUNICATION

BACKGROUND

The present invention generally relates to a method and apparatus for peer to peer audio video device communication. In particular this relates to a method and apparatus for sharing audio within a network of video cameras.

The following publications describe general networked audio video device prior art.

Patent publication EP 1881501 A1 discloses photographing apparatuses and method for wirelessly transmitting to and/or receiving data from other photographing apparatus.

Patent publication WO 2007/052269 A2 discloses wireless microphone system for high quality sound.

Patent publication U.S. Pat. No. 7,394,366 B2 discloses a method of detecting audio/video devices within a room.

Patent publication US 2012/0044354 A1 discloses versatile dual mode wireless camera hotspot device.

Patent publication US 2012/0268616 A1 discloses a self-contained wireless camera device, wireless camera system and method.

Patent publication US 2014/0043493 A1 disclose a video camera with live streaming capability.

SUMMARY

In a first aspect of the invention there is provided an audio video device comprising: detectors for detecting the orientation and position of the audio video device and the distance from a subject targeted by the audio video device; a network identifier for locating other networkable audio video devices for communication; a network database for receiving subject data for real time image subjects from one or more of the located networkable audio video devices; a primary subject audio video device identifier for determining from subject data which networkable audio video devices target the primary subject; an audio option engine for determining one or more primary subject audio video devices for use in a video; and an audio synchronization engine for synchronizing said determined one or more primary subject audio video devices for recording audio when one or more of the audio video devices is taking a video of the primary subject.

The term audio video device covers a camcorder, a camera with a video recorder and any electronic device with video recording functionality and audio recording functionality. In the embodiment, an audio video device is simply called a video device with the assumption of audio functionality. Although the preferred embodiment uses a directional microphone it is envisaged that an omnidirectional microphone could be used whereby the orientation of the audio device recording the audio is not as significant as its distance from the subject.

In a second aspect of the invention there is provided a method for communicating between a primary audio video device and other audio video devices comprising: detecting orientation and position of the primary audio video device and distance from a primary subject in focus on the primary audio video device; locating other networkable audio video devices for communication; receiving subject data for a real time image of a subject from one or more of the located networkable audio video devices; determining from subject data which networkable audio video devices are near the primary subject; determining one or more primary subject audio video devices for use in recording audio for a video; and synchronizing determined one or more primary subject audio video devices for microphone operation when one or more of the audio video devices is taking a video of the primary subject.

In the example of the preferred embodiment a master video device records the video component and another video device records the sound but in another example the master video device may be best suited to record the audio and another networkable video device can record the video component. For instance, when the microphone of the master video device is close to the subject but the subject is too large for the master video device video frame then it might be a better to record the subject from another primary subject video device.

Preferably, the method further comprising determining audio setting options for the audio video devices.

More preferably, the method further comprising selecting an optimum audio setting.

Still more preferably, the method further comprising requesting one or more determined networkable audio video devices to record audio from the subject.

Yet more preferably, the method further comprising receiving audio video device capability data from determined networkable camera flash devices.

Furthermore preferably, comprising determining a range of audio video conditions from the determined audio video devices.

Advantageously, further determining a range of audio video settings most suitable for the range of conditions and communicating those settings to appropriate determined audio video devices.

More advantageously, the audio video settings are optimized according to individual the audio video device capability.

The embodiments have an effect that operates at an audio video device level and below any overlying application level. The embodiments have an effect that results in a camera device being made to operate in a new way.

In a third aspect of the invention there is provided a computer program product for communicating between a primary audio video device and other audio video devices, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which.

DETAILED DESCRIPTION

Figure 1:
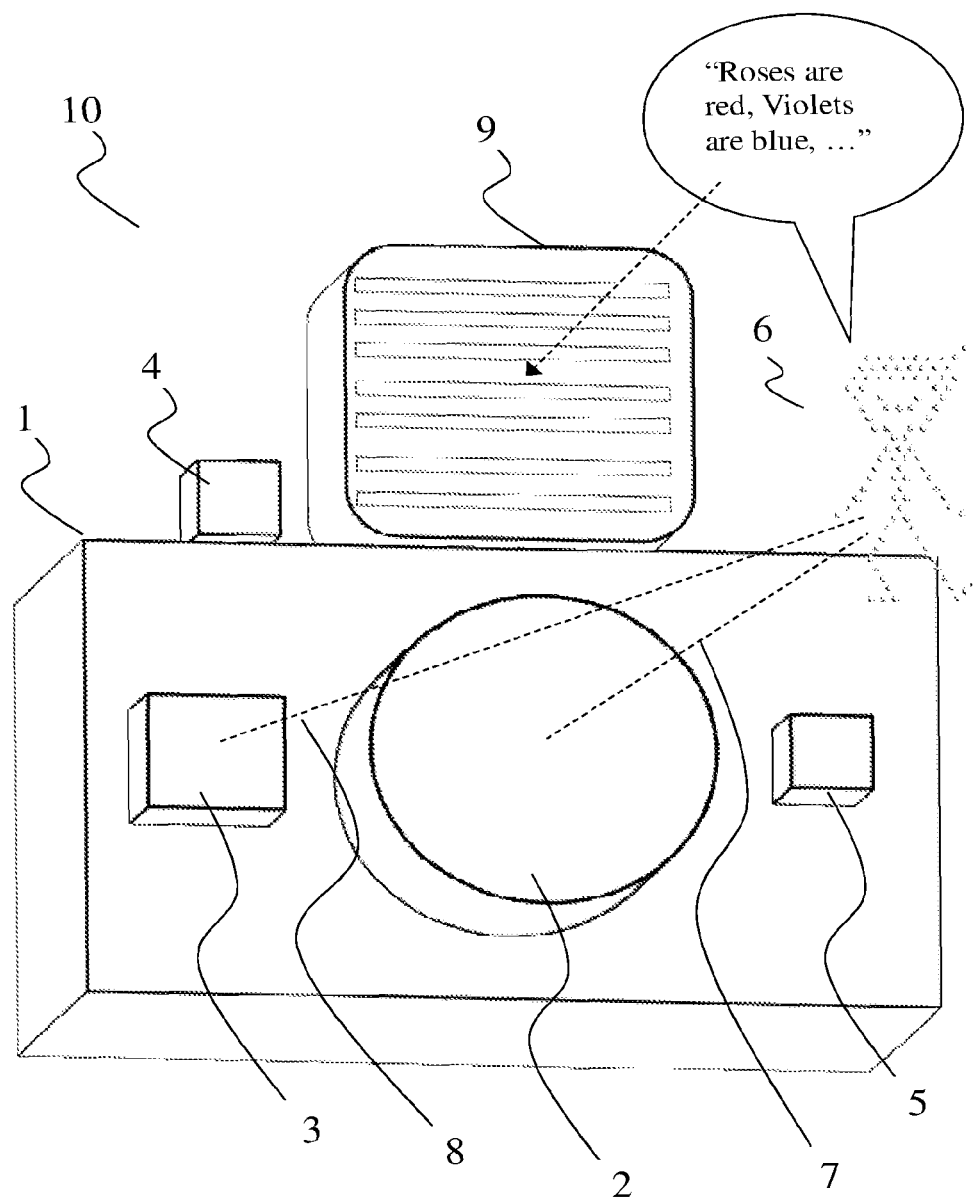
FIG. 1 is an isometric schematic diagram of a video devices according to the preferred embodiment.
Figure 3:
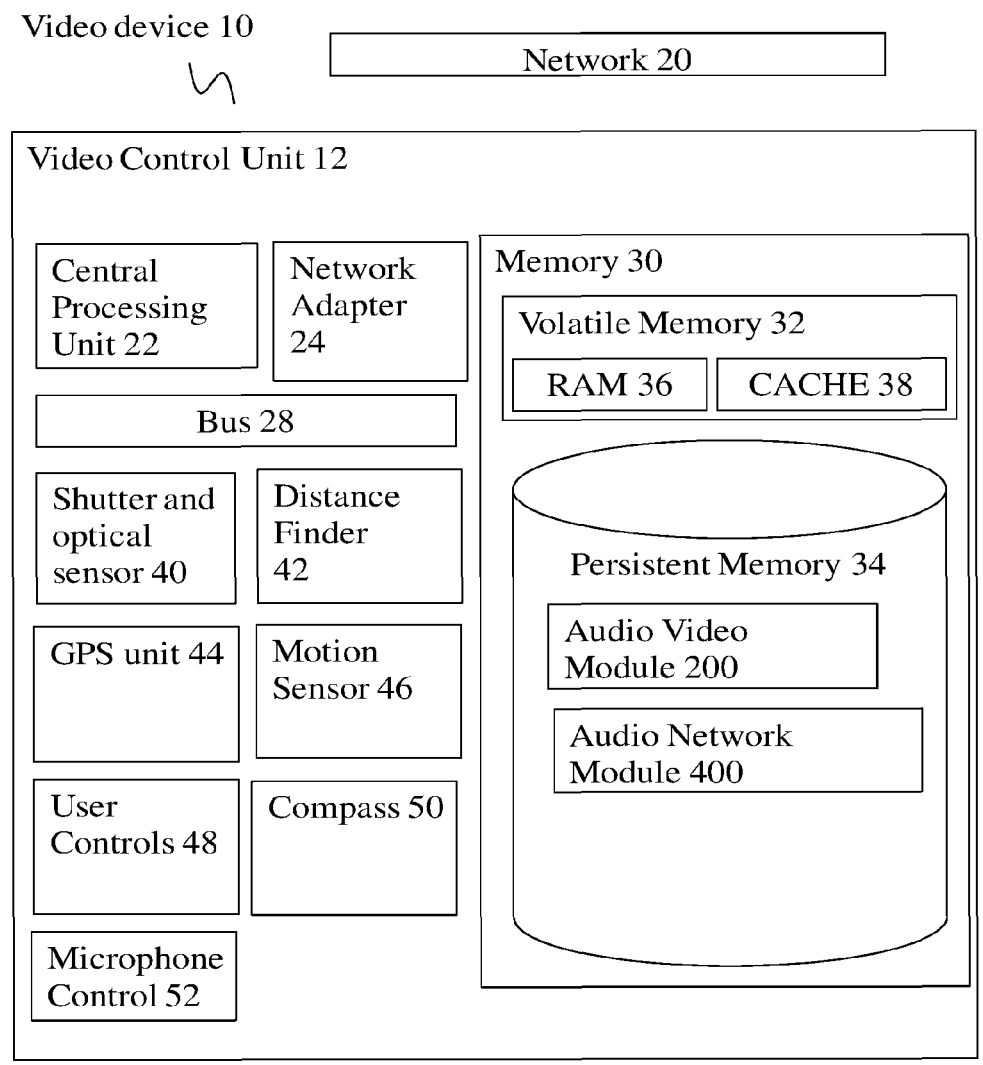
FIG. 3 is a component diagram of a video device of the preferred embodiment.

Referring to FIG. 1, a video device 10 according to the preferred embodiment comprises: a body 1; a lens 2; a distance sensor 3; video button 4; radio aerial 5; microphone 9 and a control unit 12 for taking a video of a subject 6 (hidden from view inside body 1 but shown in FIG. 3). Further features and components are necessarily part of a functioning video device and the above features are a simplified list of features that can explain the preferred embodiment.

Body 1 supports lens 2 so that a video can be taken of subject 6 whereby light from subject 6 is collected by the lens 2 and focused onto an electronic sensor that is part of control unit 12 (not shown).

Lens 2 is adjustable for bringing a picture into focus. The line of focus is represented by dotted line 7 from the center of the lens to subject 6.

Distance sensor 3 is for sensing the distance between the video device, represented by dotted line 8, and subject 6. Typically an infrared signal from distance sensor 3 is bounced off subject 6 and received back at distance sensor 3 such that the distance from distance sensor 3 to the subject 6 can be estimated from the journey time of the bounced infrared signal travelling at the speed of light.

Video button 4 is used to control the video device to focus the lens on the subject (typically a half depress of the button) and then take the video (typically a full depress of the button).

Radio aerial 5 is for sending and receiving wireless radio signals to other nearby video devices according to the preferred embodiment. In the preferred embodiment the radio signal is a low power personal network signal such a Bluetooth signal to enable a peer to peer network but other radio signal can be used including WIFI. Bluetooth is a low power wireless technology standard for exchanging data over short distances typically between personal devices in a room or car or small personal area. WIFI is a local area wireless technology that allows an electronic device to exchange data or connect to the Internet typically throughout buildings. In the preferred embodiment it is envisaged that peer to peer architecture would be the most advantageous but a client server architecture would also work. For instance, a GSM (global system for mobile telecommunications) signal can be used to create a client server embodiment where many cameras communicate with a remote server.

Microphone 9 is for recording sound from the subject when creating a video that includes a corresponding audio track.

Control unit 12 is internal to body 1 and described in FIG. 3.

Figure 2:
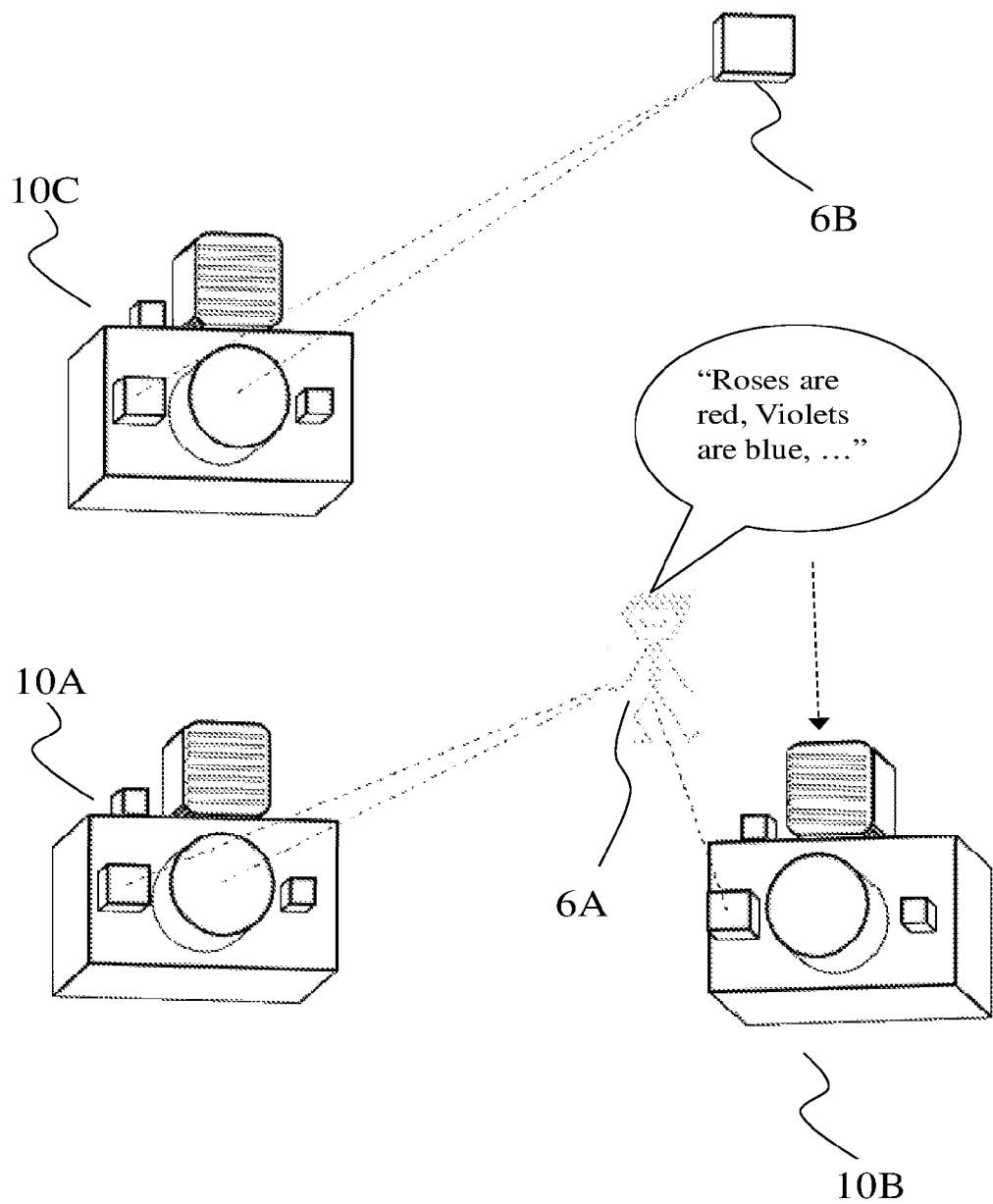
FIG. 2 is a deployment diagram of three video devices including microphones in a network according to the preferred embodiment.

FIG. 2 is an example deployment diagram of video devices 10A, 10B and 10C in a network according to the preferred embodiment. More video devices can be used but the number of video devices will be limited by the processing power of the cameras and the network bandwidth amongst other things. In this example, video devices 10A (for example the master video device) and 10B (a networkable video device) and respective microphones are pointing to the same subject 6A whereas video device 10C (another networkable video device) is pointing its microphone to another object 6B. All the video devices are capable of communicating with each other and the preferred embodiment determines those networkable video devices that are pointing to the same subject 6A.

Referring to FIG. 3, video control unit 12 of video device 10 is described. Video device 10 is a combination of a mechanical, electronic and computer system wherein the video control unit 12 may be described in the general context of computer system including computer system-executable instructions, such as program modules, being executed by a computer processor. Generally, program modules may include routines, programs, objects, components, logic, and data structures that perform particular tasks or implement particular abstract data types.

Video control unit 12 comprises: central processing unit (CPU) 22; network adapter 24; bus 28; memory 30; shutter and optical sensor 40; distance finder 42; GPS unit 44; motion sensor 46; user controls 48; compass 50; and microphone control 52.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run.

Alternatively a machine code program such as a virtual machine or an interpreter can interpret a high level language in terms of machine operations.

Network adapter 24 is connected to bus 28 and network 20 for enabling communication between the video device or a computer server (not shown).

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital versatile disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises audio video module 200 and audio network module 400. Further program modules that support the preferred embodiment but are not shown include firmware, boot strap program, operating system, and support applications. Each of the operating system, support applications, other program modules, and program data or some combination thereof, may include an implementation of a networking environment.

Audio video module 200 is a known video control mechanism for taking a video.

Audio network module 400 is for working with the existing video control mechanism to take a video according to the preferred embodiment and is described in more detail below.

Shutter and optical sensor 40 is for taking the video picture and recording a video as multiple picture images over time on the optical sensor.

Distance finder 42 is for controlling the distance sensor 3 and calculating the distance between the distance sensor and a subject.

GPS (Global Positioning System) unit 44 is for calculating the absolute position in space of the video device.

Motion sensor 46 is for fine tuning the absolute position calculation as the video device is moved.

User controls 48 is the interface for all user controls including the video button 4.

Compass 50 is a three dimensional gyroscope compass for determining the precise orientation of the video device in order to determine where the video device is pointing so that the subject of the video may be subsequently determined.

Microphone control 52 is for controlling microphone 9 so as to record audio from a subject as determined by the audio network module 400.

Figure 4:
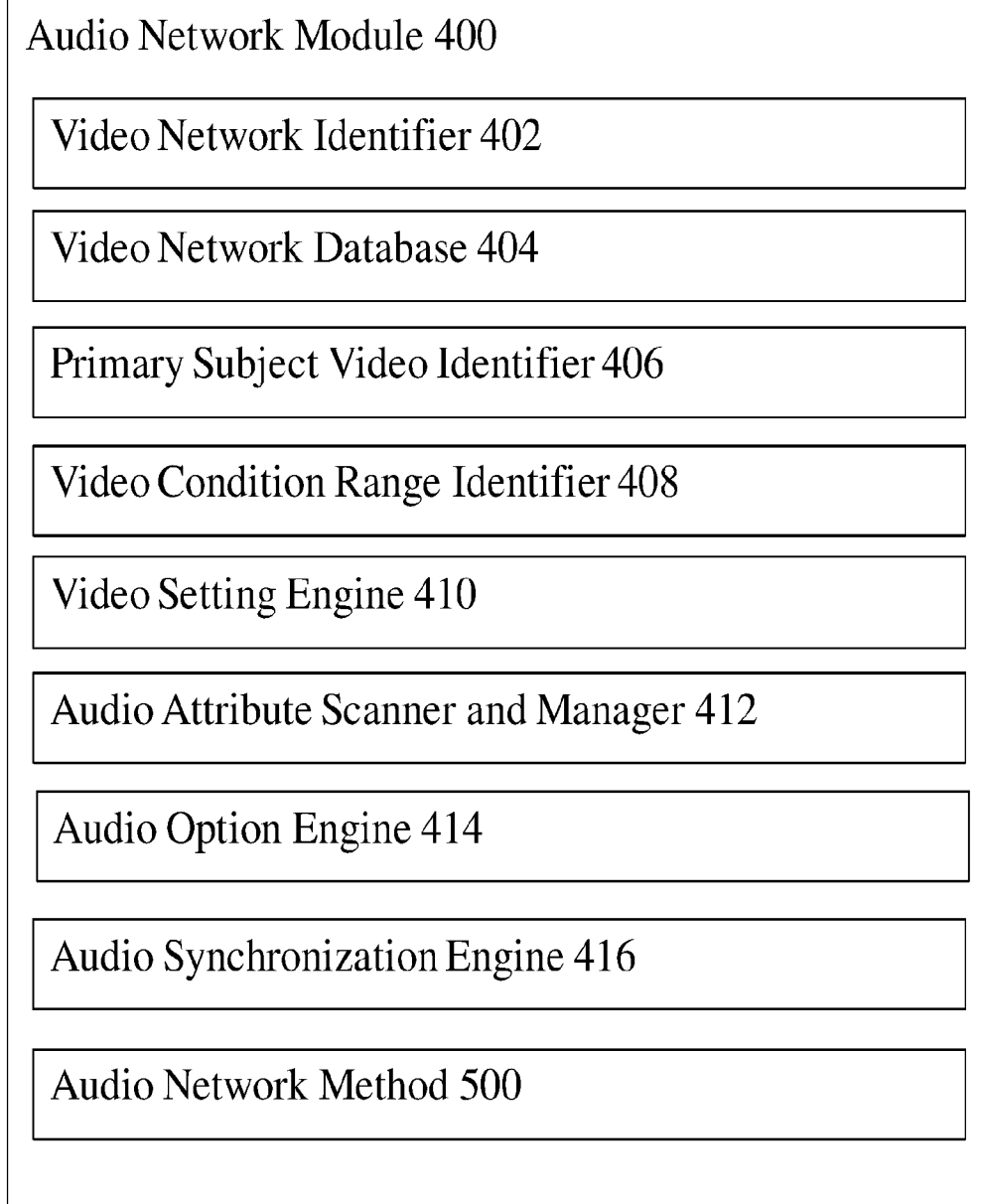
FIG. 4 is a component diagram of an audio network module of the preferred embodiment.

Referring to FIG. 4, audio network module 400 comprises the following components: video network identifier 402; video network database 404; primary subject video identifier 406; video condition range identifier 408; video setting engine 410; audio attribute scanner and manager 412; audio option engine 414; audio synchronization engine 416 and audio network method 500.

Video network identifier 402 is for identifying a network of video devices.

Video network database 404 is for receiving subject data and video device capability data from the networked video devices.

Primary subject video identifier 406 is for identifying a primary subject and corresponding video devices from the subject data of the networked videos.

Video condition range identifier 408 is for determining a range of environmental conditions for each networked video device such as distance from video device and amount of background and foreground noise from the primary subject.

Video setting engine 410 is for determining camera and camera setting pairings from the range of environmental conditions and the video capability data.

Audio attribute scanner and manager 412 is for determining and managing audio attributes.

Audio option engine 414 is for determining the different audio options available with other primary subject video devices.

Audio synchronization engine 416 is for synchronizing a selected video device (or devices) so that it can record audio at the same time as a video is recorded of a primary subject on another video device (or devices).

Audio network method 500 is for controlling and managing components in accordance with the preferred embodiment.

Figure 5:
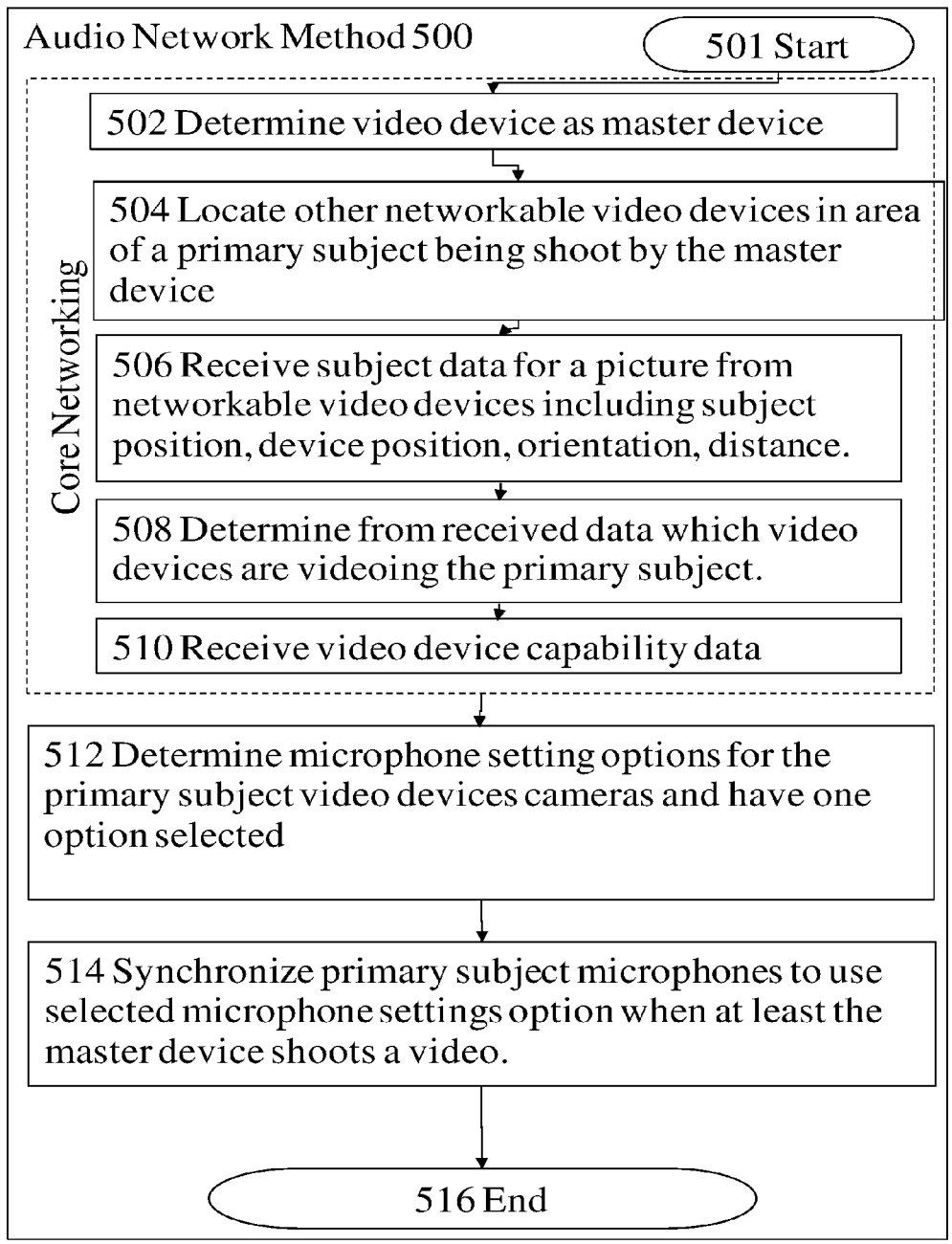
FIG. 5 is a flow diagram of a process of the preferred embodiment.

Referring to FIG. 5, audio network method 500 comprises logical process steps 501 to 516.

Step 501 is the start of audio network method 500. The preferred video device is always in network mode and the method is started when button 4 is half depressed for focusing on a primary subject. Other embodiments are envisaged where a video device can select and deselect network mode. When a primary subject is targeted, then the orientation and position of the primary video device and the range of a primary subject are measured.

Step 502 is for determining the video device with half depressed button 4 as a master video device.

Step 504 is for locating other networkable video devices in the network area of a primary subject being shoot by the master video device. The network area can be the whole possible network area or a restricted part of the possible network area.

Step 506 is for receiving subject data for a picture from networkable video devices including subject position, position, orientation, range and audio conditions.

Step 508 is for determining from received data which video devices can record audio from the primary subject.

Step 510 is for receiving video device capability data.

Steps 502 to 510 are the core networking steps that the embodiments are based on. As a result of the core networking steps the master video device can utilize the subject data and image data from both its own detectors and determined network video devices to record audio from the subject.

Step 512 is for determining microphone setting options for the primary subject video devices and having one option selected. This option is selected by an algorithm to choose the optimum audio recording combinations and optionally presented to a user to confirm or select manual from the options. In another embodiment, there are no options and a user may select audio recording combinations manually.

Step 514 is for synchronizing the primary subject video device to record audio from the primary subject using the selected microphone settings options when at least the master video camera is recording the video component of a video.

Step 516 is the end of the method.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A further embodiment of the invention is a computer program product defined in terms of a system and method. The computer program product may include a computer-readable storage medium (or media) having computer-readable program instructions thereon for causing a processor to carry out aspects of the present invention. Such a program can be transferred to an existing camera as an update to its operating system.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose camera, special purpose camera, camera device, a device with a camera or other programmable data processing apparatus to produce a machine with a camera, such that the instructions, which execute via the processor, create means for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. An audio video device comprising:
    detectors for detecting the orientation and position of the audio video device and for detecting a distance between the audio video device and a subject targeted by the audio video device;
    a network identifier for locating networkable audio video devices for communication across a network, wherein the network identifier functions in response to a picture button on the audio video device being partially depressed, and wherein the audio video device is configured to set the audio video device as a master audio video device in response to the picture button being partially depressed;
    a video condition range finder for determining a range of audio video conditions from the networkable audio video devices, wherein the range of audio video conditions for each networkable audio video device comprises a respective amount of background noise from the subject and a respective amount of foreground noise from the subject;
    a network database for receiving subject data for real time video of the subject from one or more of the networkable audio video devices;
    a primary subject audio video device identifier for determining from the subject data which networkable audio video devices are targeted on the subject;
    an audio option engine for determining one or more networkable audio video devices for use in a video; and
    an audio synchronization engine for synchronizing the audio video device and the networkable audio video devices for recording audio when one or more of the audio video devices are recording a video of the subject.

2. The audio video device of claim 1, wherein the audio option engine is for determining microphone setting options for the networkable audio video devices.

3. The audio video device of claim 2, wherein the audio option engine is further for selecting an optimum microphone setting.

4. The audio video device of claim 1, wherein the audio video device requests one or more determined networkable audio video devices to take one or more videos of the subject.

5. The audio video device of claim 1, wherein the audio video device receives audio video device capability data from the networkable audio video devices.

6. The audio video device of claim 5, wherein the audio video device determines a range of audio video camera conditions from the networkable audio video devices.

7. The audio video device of claim 6, wherein the audio video device determines a range of audio and video settings most suitable for the range of conditions and communicating those settings to the networkable audio video devices.

8. The audio video device of claim 7, wherein audio and video settings are optimized according to individual audio video device capabilities.

9. The audio video device of claim 1, wherein the network is a peer-to-peer network.

10. The audio video device of claim 1, wherein the networkable audio video devices exchange the one or more videos and corresponding audio tracks.

11. The audio video device of claim 1, wherein subject data comprises, for respective networkable audio video devices, a respective position of the subject, a respective networkable audio video device position based on input from a global positioning system (GPS) unit attached to the respective networkable audio video device, a respective networkable audio video device orientation based on input from a three-dimensional gyroscope compass coupled to the respective networkable audio video device, and a respective range between a respective networkable audio video device and the subject.

* * * * *